(12) United States Patent
Stephens

(10) Patent No.: US 7,283,989 B1
(45) Date of Patent: *Oct. 16, 2007

(54) SYSTEM AND METHOD FOR USE OF APPLICATION METADATA

(75) Inventor: Robert T. Stephens, Sharpsburg, GA (US)

(73) Assignee: AT&T BLS Intellectual Property, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 137 days.

(21) Appl. No.: 10/256,128

(22) Filed: Sep. 27, 2002

(51) Int. Cl.
*G06F 17/30* (2006.01)

(52) U.S. Cl. .................. 707/2; 707/3; 707/4; 707/5

(58) Field of Classification Search ......... 707/1–104.1, 707/200–206; 715/515; 709/217; 345/473
See application file for complete search history.

(56) References Cited

U.S. PATENT DOCUMENTS

| | | | |
|---|---|---|---|
| 6,151,624 A * | 11/2000 | Teare et al. ............. | 709/217 |
| 6,311,194 B1 * | 10/2001 | Sheth et al. ............. | 715/505 |
| 6,621,505 B1 * | 9/2003 | Beauchamp et al. ....... | 715/764 |
| 6,701,314 B1 * | 3/2004 | Conover et al. ........... | 707/7 |
| 6,732,090 B2 * | 5/2004 | Shanahan et al. .......... | 707/3 |
| 6,873,328 B2 * | 3/2005 | Vienneau et al. ......... | 345/473 |
| 6,947,947 B2 * | 9/2005 | Block et al. .............. | 707/102 |

* cited by examiner

*Primary Examiner*—Yicun Wu
(74) *Attorney, Agent, or Firm*—Withers & Keys LLC

(57) ABSTRACT

A system and method for application metadata is disclosed. A method for receiving search criteria drawn to a property of an application of an enterprise is disclosed. A method for searching a plurality of types of metadata using a search criteria is disclosed. A method for producing search results setting forth applications of an enterprise affected by a property of another application is disclosed. A metadata system comprising a plurality of types of metadata describing a plurality of applications is disclosed. A metadata system capable of searching a plurality of types of metadata based on a search criteria is also disclosed.

4 Claims, 5 Drawing Sheets

SYSTEM AND METHOD FOR USE OF APPLICATION METADATA

BACKGROUND

1. Field of the Invention

The present invention relates to a system and method for use of application metadata, and more particularly, to a metadata system capable of including or cross-referencing a plurality of types of metadata.

2. Background of the Invention

Information technicians need to analyze systems, programs, and databases ("applications") used by their enterprise. To do so, they monitor or describe various aspects of these applications. They can monitor data communicated between applications and describe data that is stored or accessible by an application. Generally, the information learned from monitoring and describing applications in these ways is called "metadata." Specifically, the two types of information learned from these ways of monitoring and describing applications are referred to herein as types of "basic metadata," and are described in greater detail below.

Metadata is data about data; it describes data. For example, data, such as a book in the library, e.g., Moby Dick, can be described as a novel; a work by Herman Melville; a work about whales and whalers; a work about relentless pursuit; and a work written in the 19$^{th}$ Century, as well as many other descriptions. In this example, the data is the text of Moby Dick and the metadata is the description of Moby Dick: the author—Herman Melville; the subject—whales, whalers, and relentless pursuits; and the time written—the 19$^{th}$ Century.

When a technician needs to analyze his enterprise's applications he can search through the enterprise's collection of basic metadata. But basic metadata does not contain enough information, making the technician's analysis incomplete and often flawed. This makes it difficult for technicians to alter and replace applications, keep an accurate map of their enterprise's applications, and fully represent all of the technology assets retained by their enterprise.

Also, when a technician needs to analyze an application he may need to search multiple repositories of metadata because each type of basic metadata is stored in its own repository. Each repository typically contains a search engine designed for that repository and that type of metadata. Thus, to analyze an application, often a technician will need to run a search for every repository and every type of metadata, and to do so may need to understand in detail each repository, how to use it, what kind of metadata it contains, and so on. Performing multiple searches is burdensome and requires a substantial amount of effort.

In addition, after performing multiple searches, technicians gain multiple sets of results, making it difficult for technicians to gain a good map of their enterprise. It is difficult for technicians to gain a good map of their enterprise because to do so technicians would need to compile and/or integrate the multiple sets of results into one "map," which may require extensive effort.

SUMMARY OF THE INVENTION

Accordingly, the present invention is directed to a method of analyzing an enterprise that substantially obviates one or more of the problems due to limitations and disadvantages of the related art.

The present invention is also directed to a metadata system that substantially obviates one or more of the problems due to limitations and disadvantages of the related art.

An object of the present invention is to provide a method whereby a single search generates a result drawn from multiple types of metadata.

Another object of the present invention is to provide a system having access to multiple types of metadata.

Additional features and advantages of the invention will be set forth in the description that follows, and in part will be apparent from the description, or may be learned by practice of the invention. The objectives and advantages of the invention will be realized and attained by the structure and steps particularly pointed out in the written description, the claims, and the drawings.

To achieve these and other advantages and in accordance with the purpose of the present invention, as embodied and broadly described, the metadata system is capable of including or cross-referencing a plurality of types of metadata.

In another aspect, the metadata system includes two or more types of metadata describing two or more applications and is capable of searching these types of metadata based on search criteria.

In another aspect, the metadata system is capable of receiving search criteria drawn to a property of an application of an enterprise, searching two or more types of metadata using the search criteria, and producing search results setting forth which other applications of the enterprise can be affected by the property of the application.

In another aspect, the metadata system includes a cross-reference system capable of communicating with two or more metadata repositories, cross-referencing metadata of the metadata repositories, and communicating with a search engine.

In another aspect, the metadata system includes eight types of metadata.

It is understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
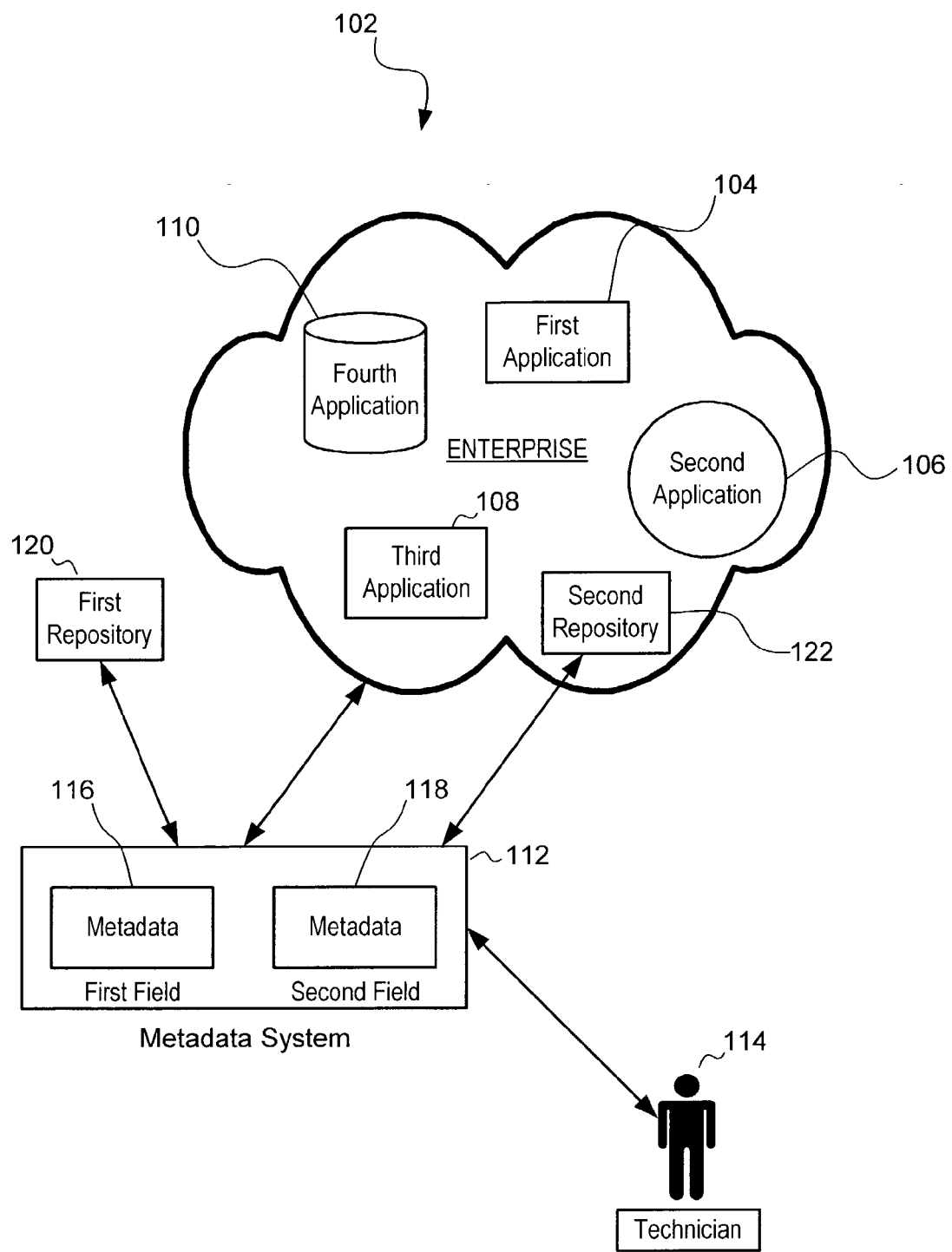
FIG. 1 is a schematic diagram of a preferred embodiment of a system in accordance with the present invention.

FIG. 1 is a schematic diagram, portions of which set forth a preferred embodiment of the present invention. The embodiment of FIG. 1 shows, in part, a metadata system 112. Metadata system 112 collects (such as in a first field 116 or a second field 118) or can communicate with repositories (such as a first repository 120 or a second repository 122) that collect metadata about applications, such as a first application 104, a second application 106, a third application 108, and a fourth application 110.

The breadth of the metadata collectable by metadata system 112 (described below) is significantly greater than the metadata currently stored in a state-of-the-art repository. This breadth of metadata, which includes advanced metadata (described below), can easily be analyzed and accessed using metadata system 112. One of the reasons that analysis and access is easier with metadata system 112, is that metadata system 112 can search a broad quantity of metadata with one search request, while currently multiple requests are needed to search metadata of such breadth.

In the embodiment set forth in FIG. 1, metadata system 112 is capable of communicating two or more types of metadata to a person, application, or entity (a technician 114), and, based on the substance of such communication, communicate some or all of the metadata at the system's disposal to technician 114.

The substance of such communication can be search criteria or otherwise. Metadata system 112 can organized search results into a sophisticated report, a broad map of the enterprise, a basic list, a human-readable or computer-readable file, or in other manners of information management and presentation known to those skilled in the art.

Preferably, enterprise 102 includes two or more applications. Each of these applications can communicate with at least one other application or can affect another application in some way. In the embodiment set forth in FIG. 1, enterprise 102 includes four applications, first application 104, second application 106, third application 108, and fourth application 110.

Generally, applications 104, 106, 108, and 110 can be computer programs (such as executable programs or databases) or any other element capable of communicating, being communicated with, or altering a computer program or system or hardware. Preferably, applications 104, 106, 108, and 110 can communicate with or in some way affect at least one other application. In the embodiment set forth in FIG. 1, applications 104, 106, 108, and 110 are capable of communicating with at least one other of applications 104, 106, 108, and 110 and metadata system 112.

Metadata system 112 is configured to include, or have access to, two or more types of metadata (further described herein). Preferably, metadata system 112 is a system capable of accessing two types of basic metadata and six types of advanced metadata, as set forth in greater detail in FIGS. 3, 4, and 5.

In an embodiment set forth in FIG. 1, metadata system 112 is capable of accessing two types of metadata, one of which is held in a first repository 120 and the other of which is held in a second repository 122. Preferably metadata system 112 is capable of accessing and searching the two types of metadata held in first repository 120 and second repository 122 by first cross-referencing the metadata held therein.

In an alternative embodiment also set forth in FIG. 1, metadata system 112 includes two types of metadata, populated in a first field 116 and a second field 118, respectively. Preferably, first field 116 is capable of holding metadata held by first repository 120 and second field 118 is capable of holding metadata held by second repository 122.

Metadata system 112 can access metadata by including metadata, accessing metadata held in one or more external repositories, or a combination of including metadata and accessing it from one or more external repositories.

First repository 120 and second repository 122 are configured to include metadata associated with applications of an enterprise. Preferably, first repository 120 and second repository 122 each hold metadata of different types, at least one of which being a type of advanced metadata (further described herein). In the embodiment set forth in FIG. 1, first repository 120 holds a type of basic metadata and second repository 122 holds a type of advanced metadata.

By way of example, first repository 120 can hold Database metadata (as described herein) and second repository 122 can hold XML Web Service metadata (as described herein). Thus, first repository 120, for example, can hold metadata describing information contained within applications 104, 106, 108, and 110, such as the author and copyright date (both of which are Database metadata) of application 104.

Technician 114 can be a person, entity, or application capable of communicating with metadata system 112. In the embodiment set forth in FIG. 1, technician 114 is a person capable of communicating with metadata system 112. With metadata system 112, technician 114 can communicate one set of search criteria to search various types of metadata. This allows technician 114 to more easily analyze applications and gain a broader view of the applications, assets, and health of an enterprise.

Preferably, metadata system 112 is configured to communicate with technician 114 in various manners. These various manners can include user-interfaces on networks (such as a global internet or a local intranet), system-to-system interfaces also on networks, or other methods known to one skilled in the art.

If technician 114 is a person, metadata system 112 preferably is configured to include a user-interface. In an exemplary embodiment (not shown), metadata system 112 is configured to allow technician 114 to communicate with metadata system 112 through an intranet-based user-interface. This user-interface preferably is user-friendly, able to receive search criteria, present search results, and otherwise format information from metadata system 112 into an easy-to-use form.

Figure 2:
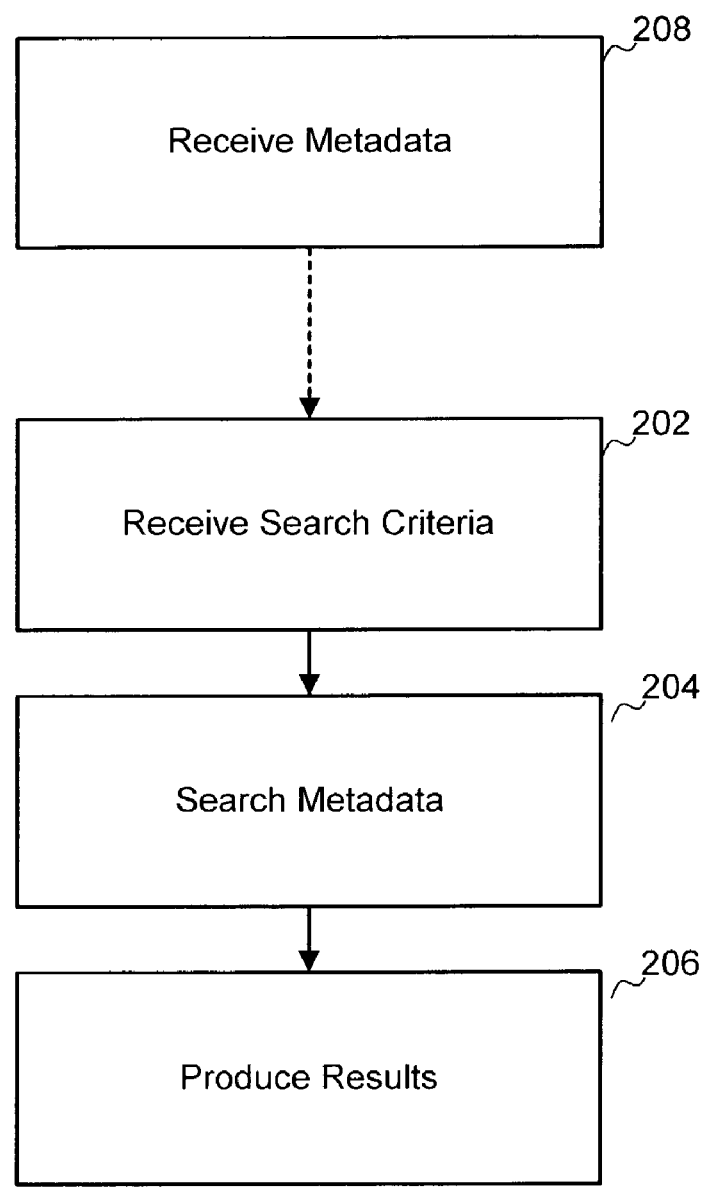
FIG. 2 is a flow diagram of a preferred embodiment of a method in accordance with the present invention.

FIG. 2 is a flow diagram of a preferred embodiment of a method in accordance with the present invention. This preferred embodiment shows, in part, a method showing how a metadata system can be used to investigate an application.

FIG. 2 shows three steps, a receive search criteria 202 step, a search metadata 204 step, and a produce results 206 step. In some embodiments, a further step of receiving metadata 208 may be included. In this optional step, a metadata system receives one or more types of metadata regarding a plurality of applications. This additional step can be used when the metadata system stores metadata.

In step 202 of FIG. 2, metadata system 112 (see FIG. 1) receives search criteria. Preferably, metadata system 112 receives search criteria regarding an application from technician 114.

Such search criteria can relate to many different types and properties of applications. For example, a search criteria can be a question attempting to determine: when a particular application communicates with another application and how often; the protocol governing how information is communicated to other applications; the size and type of information communicated; how often the application is accessed by other applications; which applications or entities last altered an application; when the application last failed to perform to its specifications; what type of information is stored by the application; and other criteria related to a aspect, description, or function of an application.

In step 204 of FIG. 2, metadata system 112 searches metadata. Preferably, metadata system 112 searches, based on search criteria, a plurality of types of metadata. Also preferably, metadata system 112 searches a plurality of types of metadata using the search criteria.

In some embodiments, metadata system 112 searches a plurality of types of metadata where one of those types of metadata is of a basic type and one is of an advanced type. In some other embodiments, metadata system 112 searches a plurality of types of metadata, where two or more of those types of metadata are of an advanced type.

In step 206 of FIG. 2, metadata system 112 produces search results. Preferably, metadata system 112 produces search results setting forth information about a property of an application or other application(s) of the enterprise that can be affected by the property of the application.

Also preferably, metadata system 112 produces search results setting forth how other applications of the enterprise can be affected by a property of an application, such as by informing technician 114 that other applications rely on the property of the application for the other applications' ability to display information or process data.

Also preferably, metadata system 112 produces search results compiling the results into a report.

In an exemplary embodiment of steps 202, 204, and 206, metadata system 112 receives search criteria (step 202) from technician 114 drawn to a property of application 104 of enterprise 102. In this embodiment, technician 114 wishes to determine how lengthening a particular data field (such as a name-field) of application 104 may affect applications 104, 106, 108, and 110, and ultimately, enterprise 102.

Also in this exemplary embodiment, application 104 receives information from a third entity (an application, system, or person outside of enterprise 102) into the name-field, such as by a new employee entering his or her name into the name-field of application 104. Continuing this example, the name-field of application 104 is currently capable of accepting a name having up to thirty characters. A new employee, however, has a long name having forty-three characters. Technician 114, wishing to alter application 104 by expanding the name-field to accept names having up to fifty characters, needs to determine how application 104 and other applications, such as applications 106, 108, and 110, may be affected.

As part of this example and according to step 202, metadata system 112 receives from technician 114 search criteria drawn to the name-field of application 104.

Also in this exemplary embodiment, metadata system 112 searches one basic and one advanced type of metadata (step 204). The basic type being that of Data Movement (as defined herein) and the advanced type being that of Systems and Interfaces (as defined herein).

Metadata system 112 can search, depending on how metadata system 112 is structured, metadata stored in metadata system 112, or various other metadata repositories (such as a Data Movement repository and a Systems and Interfaces repository). In either case, metadata system 112 searches, in this example, these two types of metadata.

Metadata system 112, having received the search criteria from technician 114 drawn to the name-field of application 104, searches these two types of metadata, according to step 204.

Continuing this exemplary embodiment, metadata system 112 finds by searching through Data Movement metadata that application 104 regularly sends data from name-fields to application 110 (in this example an employee database application). Through this search, metadata system 112 finds that application 110 can accept, without altering application 110, data from application 104's name-field based on a field of fifty characters.

Metadata system 112 also searches through Systems and Interface metadata, finding that application 110 occasionally sends information through an interface to application 106 (in this example a marketing application that creates employee biographies) and that this information contains data that application 110 receives from application 104's name-fields. Metadata system 112 also finds through this search that the interface is not configured to receive a data-string from application 110 based on the additional characters caused by expanding application 104's name-field to fifty characters.

Continuing this example, metadata system 112, having searched a basic and an advanced type of metadata according to step 204, produces results of such search, according to step 206. Metadata system 112 produces results showing technician 114 that, before altering the name field (a property of application 104), the technician needs to alter an interface between application 110 and application 106.

This exemplary embodiment shows one of the many ways in which the invention can aid a technician in understanding how a property of an application affects not only itself, but other applications within an enterprise.

The invention can be used to aid a technician in many other ways, such as by reducing the number of searches a technician needs to perform, as well as by producing more comprehensive results than are currently available.

Figure 3:
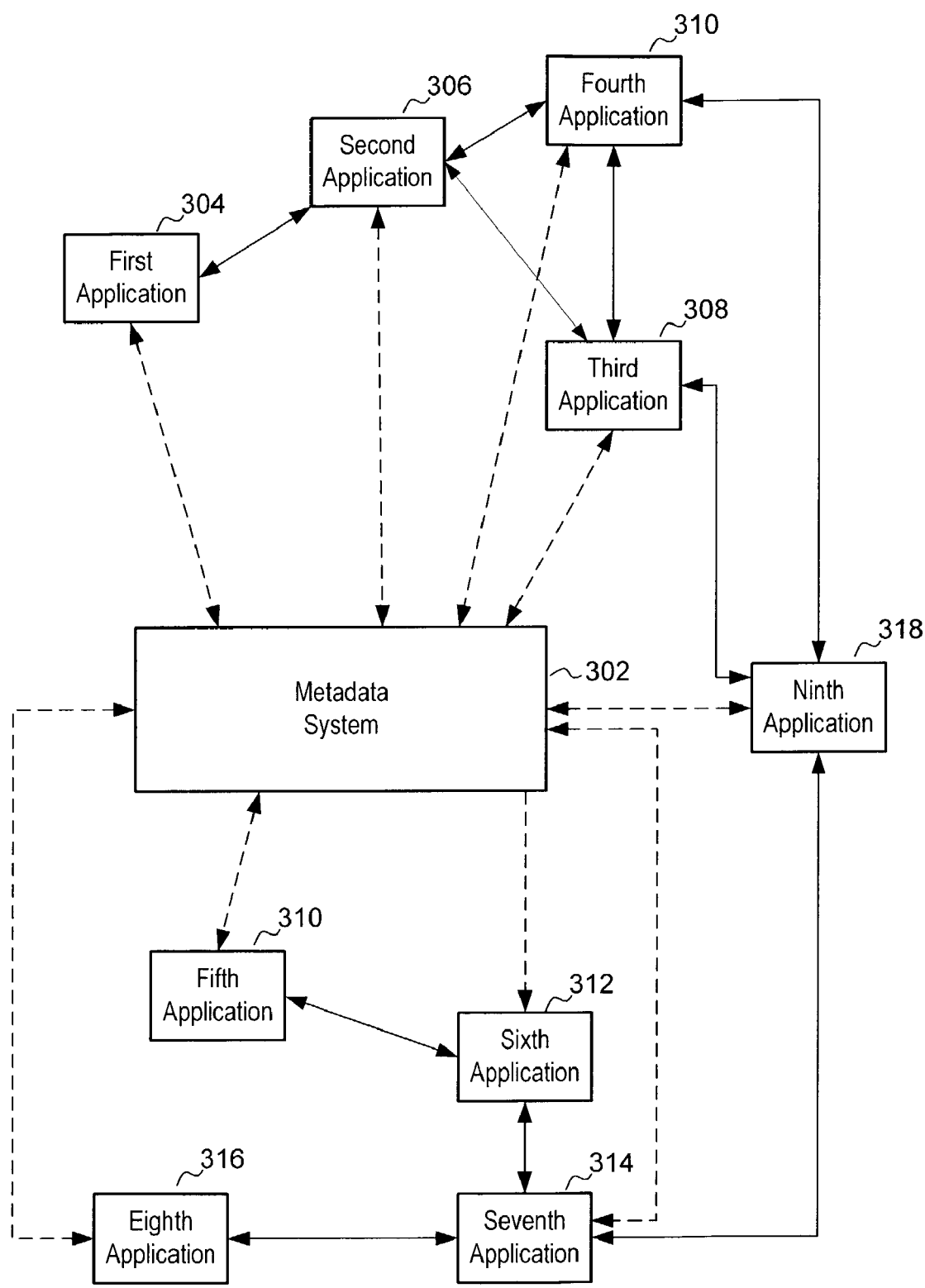
FIG. 3 is a schematic diagram of a preferred embodiment of a system in accordance with the present invention.

FIG. 3 is a schematic diagram, portions of which set forth a preferred embodiment of the present invention. This embodiment shows a system capable of receiving multiple types of metadata from multiple applications. The metadata received can be structured in various ways. In an exemplary embodiment, the metadata, after being received by a metadata system 302, is converted into a standardized form, such as the Dublin Core form.

In this preferred embodiment set forth in FIG. 3, metadata system 302 is configured to receive advanced and basic metadata regarding various applications.

Advanced metadata includes information about applications that is not currently available to many technicians. Advanced metadata preferably includes various types of information about an application, such as metadata about systems and interfaces ("Systems and Interfaces"), reusable aspects ("Reusable Components"), and activities and actions ("Metrics"). Advanced metadata preferably also includes XML artifacts utilized in web services ("XML Web Services"), information about collections of other metadata ("Document"), and unstructured metadata held by an enterprise ("Enterprise Information"), all of which are described in more detail below.

Basic metadata includes information about applications that is currently available to many technicians. Basic metadata includes metadata about information communicated to and from an application ("Data Movement") and metadata about information that describes the application or the data stored or accessible by the application ("Database"), both of which are described in greater detail below.

With advanced metadata, a technician can more completely analyze applications. By so doing, he can learn how replacing or changing an application will affect other applications and the company's enterprise.

This embodiment describes, in part, some of the complexity to which metadata system 302 can be used to simplify. In this embodiment, metadata system 302 receives eight different types of metadata regarding nine different applications. A technician wishing to analyze metadata for an application can, using metadata system 302 set forth in this embodiment, communicate with just one system (metadata system 302) regarding the properties and interactions of nine different applications. These properties and interactions preferably are described in this embodiment with eight different types of metadata. Thus, even with only nine applications (many enterprises have hundreds of applications) a technician's task of analyzing properties of applications can be very complex; this complex task is simplified with metadata system 302.

In this embodiment, metadata system 302 communicates with repositories (not shown) or itself communicates with a first application 304; a second application 306; a third application 308; a forth application 310; a fifth application 312; a sixth application 312; a seventh application 344; an eighth application 316; and a ninth application 318.

Generally, applications 304, 306, 308, 310, 312, 314, 316, and 318 can be computer programs (such as executable programs and databases), systems, or any other element capable of communicating, being communicated with, or altering a computer program, system, or hardware. Preferably, applications 304, 306, 308, 310, 312, 314, 316, and 318 can communicate with or in some way affect at least one other application.

As set forth in FIG. 3, first application 304 communicates with second application 306. Second application 306 communicates with first application 304 and third application 308. Third application 308 communicates with second application 306, forth application 310, and ninth application 318. Forth application 310 communicates with second application 306, third application 308, and ninth application 318. Fifth application 310 communicates with sixth application 312. Sixth application 312 communicates with seventh application 314. Seventh application 314 communicates with eighth application 316, sixth application 312, and ninth application 318.

Metadata system 302 preferably is capable of receiving metadata describing as many of the properties of applications as possible.

In the embodiment set forth in FIG. 3, metadata system 302 is configured to receive Systems and Interfaces metadata. Systems and Interfaces metadata can include information describing an application, the owner of an application, the function of an application, the current and planned interface between an application and other applications, the type of interface used between an application and another application, business units and towers that use an interface, transfer protocols used by an application, interfaces with a navigator (if used), the status and tracking interface projects of an enterprise, the volume and peak hours of an interface between two applications, and response times for implementing changes to an application.

Also in the embodiment set forth in FIG. 3, metadata system 302 is configured to receive Reusable Components metadata. Reusable Components metadata preferably includes information about reuse of source and object codes of an application; about behaviors and functionality for a class structure of an application; describing the architecture and framework of an application (usually as it is in development); describing aspects of encapsulating objects within a programming environment; describing the basic architecture of a collection of objects that perform a specific function; setting forth keywords, author, title, and description of an application; describing an artifact that is or is part of an application; and describing patterns such as class diagrams.

Also in the embodiment set forth in FIG. 3, metadata system 302 is configured to receive Activities and Actions metadata. Activities and Actions metadata preferably includes implementation and measurement statistics of such actions and activities of an application, such as failure rates caused by a particular action, e.g., failure to load a particular piece of data due to the data being corrupted. Activities and Actions metadata preferably also includes descriptions of measurements of an application's performance, information regarding values for domains, and information regarding results of an action or activity.

Also in the embodiment set forth in FIG. 3, metadata system 302 is configured to receive XML Web Services metadata (XML is an acronym for "extensible markup language"). XML Web Services metadata preferably describes artifacts utilized in a web service, such as a description of a service available through an HTTP ("Hyper-Text Transfer Protocol") and artifacts surrounding an XML exchange of information. XML metadata preferably also includes information about projects, describing artifacts and style-sheets, describing a web service, and describing SOAPs ("Simple Object Access Protocol") and UDDI ("Universal Description Discovery Integration").

Also in the embodiment set forth in FIG. 3, metadata system 302 is configured to receive Collections metadata. Collections metadata preferably includes information about collections of metadata artifacts, projects, and organizations. Collections metadata preferably also includes metadata describing metadata about the content of an application, the content itself, information within an application, and the look and feel of information within an application.

Also in the embodiment set forth in FIG. 3, metadata system 302 is configured to receive Enterprise metadata. Enterprise metadata includes unstructured metadata held by an enterprise. Preferably the Enterprise metadata held by the enterprise includes the name, author, title, subject, keywords, ownership and use of an application; applications related to the application; and other notes about the application.

In addition to the above advanced metadata, metadata system 302 is configured to receive, in the embodiment set forth in FIG. 3, basic metadata, such as Data Movement and Database metadata. Database metadata contains information stored in an application, such as information regarding a database, table, field, business rules, steward contacts, domains, valid values for fields, and data types used by an application. Data Movement metadata is typically captured using an extraction transformation and load (ETL) tool. Data Movement metadata includes information about the movement of data between two applications, such as field-to-field mapping and transformation rules.

This breadth of advanced metadata can enable technicians to better determine how a change or replacement of an application can affect other applications. Being able to easily and accurately determine how one application affects another is extremely valuable to technicians; it can reduce failures and improve performance of applications. It is especially useful when an application must be altered, repaired, or replaced. It is also especially useful when a technician is attempting to gain a large map of his enterprise—the applications used, information passed between applications, and a map of its assets.

Also in the embodiment set forth in FIG. 3, metadata system 302 is configured to search, organize, and produce reports of metadata based on the search. Metadata system 302 is configured to search such metadata based on search criteria. Such search criteria can be broad, including covering the entire enterprise, narrow, including covering just a small aspect of an application, or in-between.

Using search criteria, metadata system 302 is configured to search metadata, organize it based upon the results of the search, and produce reports.

Metadata system 302 may, for example, receive a search criteria requesting all of the applications within the enterprise that can communicate with an application outside of the enterprise. In this example, metadata system 302 can search all metadata available (such as the eight types set forth above), resulting in, for example, five applications: Netscape Navigator™; an employee database; a marketing program; Adobe Acrobat™; and a custom global internet firewall program.

Metadata system 302 then organizes the results, in this case to aid in presenting them graphically (with appropriate icons) and in a list (showing which applications outside of the enterprise with which each of these five applications can communicate). Continuing this example, metadata system 302 can then produce a report of the results of the search.

In one example, metadata system 302 can present a report in the form of a graphical map. This graphical map preferably showing icons for each of the five applications and icons or names of each application outside of the enterprise with which each can communicate, and showing the communication with a solid line drawn between them.

In another example, metadata system 302 can present a report in the form of a table. This table preferably showing each of the five applications at the top of a column and the applications outside of the enterprise with which each communicates in the column below.

Metadata system 302 can respond to a wide variety of search criteria because, in part, metadata system 302 has access to many different and diverse types of metadata. These diverse types of metadata provide metadata system 302 with a broad base of metadata describing many aspects and properties of applications.

Figure 4:
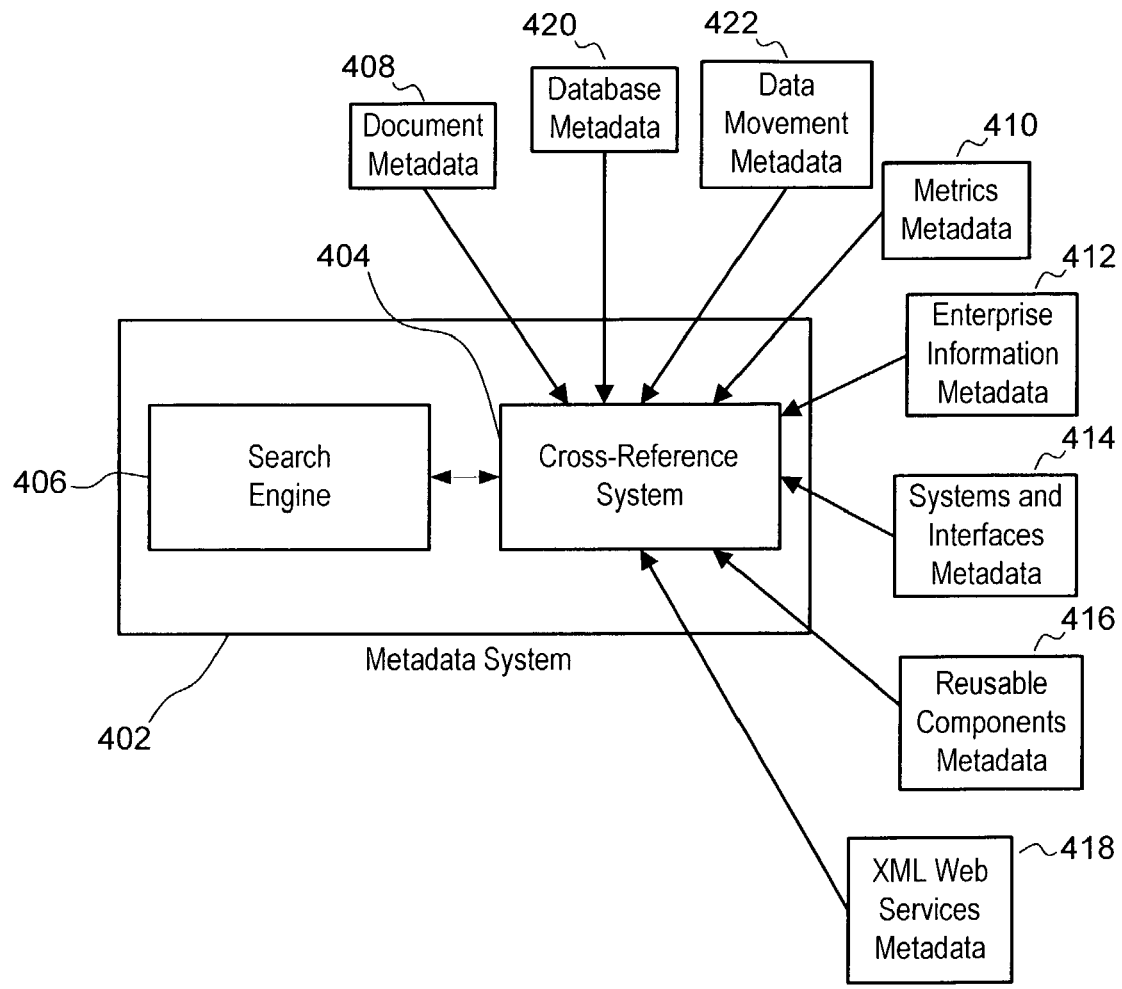
FIG. 4 is a schematic diagram of a preferred embodiment of a system in accordance with the present invention.

FIG. 4 is a schematic diagram, portions of which set forth a preferred embodiment of the present invention. This embodiment shows a system configured to communicate with and cross-reference metadata contained within a multitude of metadata repositories. This embodiment also shows a system configured to search cross-referenced metadata contained within a multitude of metadata repositories.

FIG. 4 shows, in part, a preferred embodiment of a metadata system. FIG. 4 shows a metadata system 402, a cross-reference system 404, a search engine 406, a document metadata repository 408, a metrics metadata repository 410, an enterprise information metadata repository 412, a systems and interfaces metadata repository 414, a reusable components metadata repository 416, an XML web services metadata repository 418, a database metadata repository 420, and a data movement metadata repository 422.

Generally, metadata system 402 includes a cross-reference system. In the preferred embodiment set forth in FIG. 4, metadata system 402 includes cross-reference system 404. Also preferably, cross-reference system 404 is capable of cross-referencing metadata of a plurality of metadata repositories. In the preferred embodiment set forth in FIG. 4, cross-reference system 404 is capable of cross-referencing all or a portion of the metadata stored in repositories 408, 410, 412, 414, 416, 418, 420, and 422.

Metadata system 402 preferably includes a search engine or can communicate with a search engine. In the preferred embodiment set forth in FIG. 4, metadata system 402 includes search engine 406.

Preferably, search engine 406 is capable of searching a plurality of metadata repositories based on cross-referenced metadata.

Cross-reference system 404 preferably is capable of communicating with a plurality of metadata repositories. Also preferably, cross-reference system 404 is capable of communicating with a search engine.

In the preferred embodiment set forth in FIG. 4, cross-reference system 404 is capable of communicating with search engine 406 and repositories 408, 410, 412, 414, 416, 418, 420, and 422.

Advanced metadata repository 408 preferably includes one or more types of advanced metadata. In the preferred embodiment set forth in FIG. 4, advanced metadata repository 408 includes a Document type of metadata.

Advanced metadata repository 410 preferably includes one or more types of advanced metadata. In the preferred embodiment set forth in FIG. 4, advanced metadata repository 410 includes a Metrics type of metadata.

Advanced metadata repository 412 preferably includes one or more types of advanced metadata. In the preferred embodiment set forth in FIG. 4, advanced metadata repository 412 includes an Enterprise Information type of metadata.

Advanced metadata repository 414 preferably includes one or more types of advanced metadata. In the preferred embodiment set forth in FIG. 4, advanced metadata repository 414 includes a Systems and Interfaces type of metadata.

Advanced metadata repository 416 preferably includes one or more types of advanced metadata. In the preferred embodiment set forth in FIG. 4, advanced metadata repository 416 includes a Reusable Components type of metadata.

Advanced metadata repository 418 preferably includes one or more types of advanced metadata. In the preferred embodiment set forth in FIG. 4, advanced metadata repository 418 includes an XML Web Services type of metadata.

Basic metadata repository 420 preferably includes one or more types of basic metadata. In the preferred embodiment set forth in FIG. 4, basic metadata repository 420 includes a Database type of metadata.

Basic metadata repository 422 preferably includes one or more types of basic metadata. In the preferred embodiment set forth in FIG. 4, basic metadata repository 422 a Data Movement type of metadata.

Metadata system 402 is configured to organize and produce reports of metadata it has searched. Preferably, metadata system 402 is configured to search metadata in a plurality of repositories (such as repositories 412 and 416) based on search criteria. Such search criteria can be broad, including covering the entire enterprise, narrow, including covering just a small aspect of an application, or in-between.

Using search criteria, metadata system 402 is configured to search metadata in repositories, organize it based upon the results of the search, and produce reports.

Metadata system 402 may, for example, receive a search criteria requesting an analysis of one part of the program code of a particular application. In this example, technician 114 (see FIG. 1) wants to determine if a particular piece of code (a sub-program) within a first application can be copied and used to replace another sub-program in a second application. The sub-programs of both the first and second application convert numerical-form dates into mixed textual dates, such as converting "day #60 of year 2000"to "Feb. 29, 2001." The technician desires to replace the sub-program of the second application because he believes it has failed to take leap-years into account and so may convert "day #60 of year 2000" to "Mar. 1, 2001."

In this example, metadata system 402 searches all metadata available (such as the eight types set forth above). Also in this example, the search results produced are of two types from two repositories: Enterprise Information metadata from enterprise information metadata repository 412 and metadata regarding reusability from reusable components metadata repository 416. These results show metadata from repository 412, which includes comments made by an ex-employee regarding the sub-program of the second application: "this sub-program has now been made y2k (year 2000) compliant; it now accepts data from date-fields having four digits for the year" and regarding the second application generally: "this application has now been made y2k (year 2000) compliant; it will send and receive dates having four digits for the year." The results also show metadata from repository 416 showing that both sub-programs communicate information to the application in which they are a part in the same form.

Metadata system 402 then organizes the results into a report for technician 114, such as setting forth the results in the form of a list. Technician 114 could then, reading this list, replace the sub-program of the second application with a copy of the sub-program of the first application, because he knows that they are compatible (they communicate information in the same form, and the second application can accept years as four digit numbers from its sub-program, which the sub-program from the first application also generates).

Metadata system 402 can respond to a wide variety of search criteria because, in part, metadata system 402 can cross-reference and search many different and diverse types of metadata. These diverse types of metadata provide metadata system 402 with a broad base of metadata describing many aspects and properties of applications.

Figure 5:
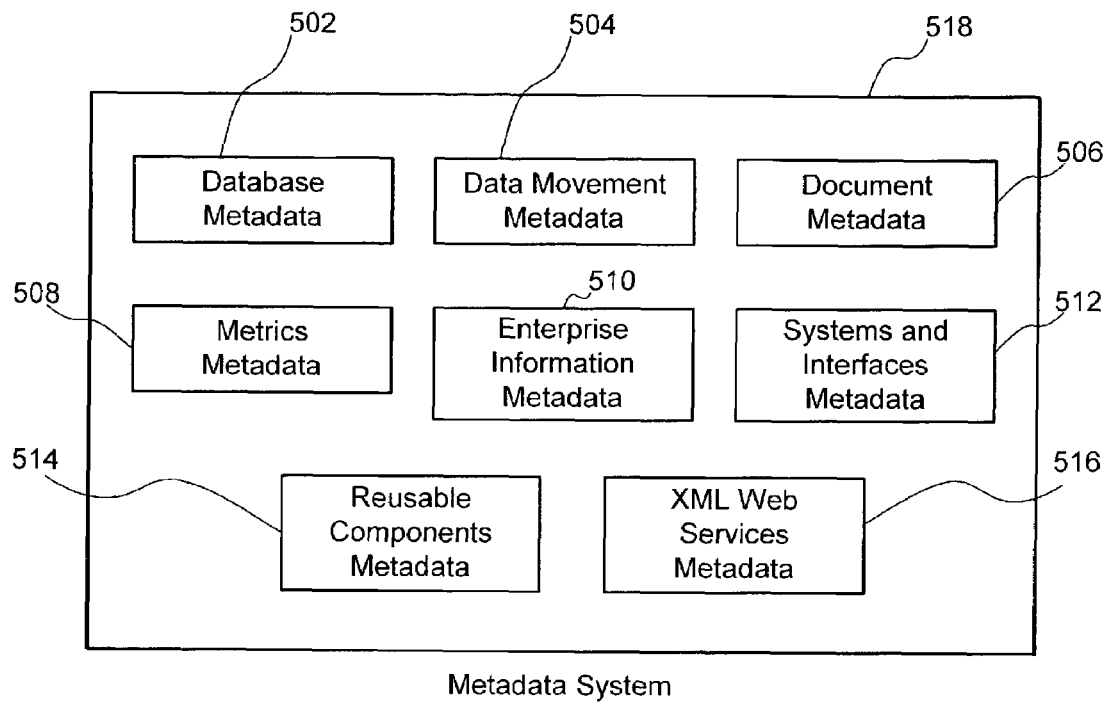
FIG. 5 is a schematic diagram of a preferred embodiment of a system including advanced metadata in accordance with the present invention.

FIG. 5 is a schematic diagram, portions of which set forth an alternative embodiment of a metadata system. This alternative embodiment shows an embodiment of a metadata system capable of including various types of metadata.

FIG. 5 shows a metadata system 518, a document metadata 506, a metrics metadata 508, an enterprise information metadata 510, a system and interfaces metadata 512, a reusable components metadata 514, an XML web services metadata 516, a database metadata 502, and a data movement metadata 504.

Metadata system 518 preferably includes a plurality of types of metadata describing a plurality of applications. In one preferred embodiment, metadata system 518 includes a plurality of types of advanced metadata. In another preferred embodiment, metadata system 518 includes one or more types of advanced metadata and one or more types of basic metadata.

In the exemplary embodiment set forth in FIG. 5, metadata system 518 includes the types of metadata included within repositories 502, 504, 506, 508, 510, 512, 514, and 516 (described further below).

Preferably metadata system 518 also is capable of searching the plurality of types of metadata based on search criteria.

Advanced metadata repository 506 preferably includes one or more types of advanced-metadata. In the exemplary embodiment set forth in FIG. 5, advanced metadata repository 506 includes a Document type of metadata.

Advanced metadata repository 508 preferably includes one or more types of advanced metadata. In the exemplary embodiment set forth in FIG. 5, advanced metadata repository 508 includes a Metrics type of metadata.

Advanced metadata repository 510 preferably includes one or more types of advanced metadata. In the exemplary embodiment set forth in FIG. 5, advanced metadata repository 510 includes an Enterprise Information type of metadata.

Advanced metadata repository 512 preferably includes one or more types of advanced metadata. In the exemplary embodiment set forth in FIG. 5, advanced metadata repository 512 includes a Systems and Interfaces type of metadata.

Advanced metadata repository 514 preferably includes one or more types of advanced metadata. In the exemplary embodiment set forth in FIG. 5, advanced metadata repository 514 includes a Reusable Components type of metadata.

Advanced metadata repository 516 preferably includes one or more types of advanced metadata. In the exemplary embodiment set forth in FIG. 5, advanced metadata repository 516 includes an XML Web Services type of metadata.

Basic metadata repository 502 preferably includes one or more types of basic metadata. In the exemplary embodiment set forth in FIG. 5, basic metadata repository 502 includes a Database type of metadata.

Basic metadata repository 504 preferably includes one or more types of basic metadata. In the exemplary embodiment set forth in FIG. 5, basic metadata repository 504 includes a Data Movement type of metadata.

The foregoing disclosure of the preferred embodiments of the present invention has been presented for purposes of illustration and description. It is not intended to be exhaustive or to limit the invention to the precise forms disclosed. Many variations and modifications of the embodiments described herein will be known to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of analyzing an enterprise, comprising:
   receiving search criteria drawn to a property of a computer application of the enterprise, the property comprising a number of characters defined for a field of the application, wherein the application interacts with at least a second computer application;
   searching a plurality of types of metadata using the search criteria wherein the metadata describes each of a plurality of computer applications of the enterprise and how each computer application of the plurality affects other computer applications of the plurality by setting forth the maximum number of characters defined for a field incorporated in the plurality of computer applications;

cross-referencing between the types of metadata, wherein the types of metadata include at least one of Data Movement metadata and Systems and Interface metadata, Data Movement metadata being captured using an extraction transformation and load tool; and producing search results setting forth which other computer applications of the enterprise can be affected by the property of the computer application by setting forth which of the computer applications have a maximum number of characters defined that is less than the number of characters of the search criteria, wherein the search results are presented in at least one of a graphical map and a table and not a list.

2. The method of claim 1, wherein the search results set forth how the other computer applications of the enterprise can be affected by the property of the computer application by stating that the number of characters specified by the search criteria cannot be accepted by the computer application.

3. The method of claim 1, wherein the searching a plurality of types of metadata using the search criteria searches one or more basic types of metadata and one or more advanced types of metadata.

4. The method of claim 1, wherein the searching a plurality of types of metadata using the search criteria searches a plurality of advanced types of metadata.

* * * * *